United States Patent
Heo et al.

(10) Patent No.: US 9,342,751 B2
(45) Date of Patent: May 17, 2016

(54) USER HAND DETECTING DEVICE FOR DETECTING USER'S HAND REGION AND METHOD THEREOF

(71) Applicant: Electronics and Telecommunications Research Institute, Daejeon (KR)

(72) Inventors: Gi Su Heo, Jeollabuk-do (KR); Dong Woo Lee, Daejeon (KR); Sung Yong Shin, Deajeon (KR); Ga Gue Kim, Daejeon (KR); Hyung Cheol Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/712,391

(22) Filed: May 14, 2015

(65) Prior Publication Data

US 2015/0332471 A1    Nov. 19, 2015

(30) Foreign Application Priority Data

May 14, 2014 (KR) .................. 10-2014-0057774

(51) Int. Cl.
*G06K 9/46* (2006.01)
*G06T 7/00* (2006.01)
(Continued)

(52) U.S. Cl.
CPC .......... *G06K 9/4642* (2013.01); *G06K 9/00201* (2013.01); *G06K 9/00362* (2013.01);
(Continued)

(58) Field of Classification Search
CPC ... G06T 7/0081; G06T 7/0087; G06T 7/0093; G06T 7/0097; G06T 7/408; G06T 2207/10024; G06T 2207/10028; G06T 2207/20072; G06T 2207/20076; G06T 2207/30196; G06K 9/00375; G06K 9/4642; G06K 9/4652; G06K 9/00201; G06K 9/00355; G06K 9/00362; G06K 9/46
See application file for complete search history.

(56) References Cited

U.S. PATENT DOCUMENTS 6,404,900 B1 *  6/2002  Qian .................. G06K 9/00228
                                              348/169
7,236,629 B2 *  6/2007  Cooper ............. G06K 9/00228
                                              348/E9.04

(Continued)

FOREIGN PATENT DOCUMENTS

KR   10-2010-0138602 A   12/2010
KR   10-2013-0137507 A   12/2013
KR   10-2013-0143405 A   12/2013

OTHER PUBLICATIONS

Wang, Q. et al., "Skin Color Weighted Disparity Competition for Hand Segmentation from Stereo Camera," Proceedings of the British Machine Vision Conference, Sep. 2010, pp. 1-11.

*Primary Examiner* — Manav Seth
(74) *Attorney, Agent, or Firm* — Nelson Mullins Riley & Scarborough LLP; Anthony A. Laurentano

(57) ABSTRACT

Technology for a method of detecting a user hand by a user hand detecting device. The method according to an aspect of the present invention includes extracting a first mask image from a depth image in which the user hand is imaged; extracting a second mask image having a preset skin color value among regions corresponding to the first mask image in a color image in which the user hand is imaged; generating a skin color value histogram model in a color space different from a region of the color image corresponding to a color region of the second mask image; generating a skin color probability image of the different color space from the color image using the skin color value histogram model and an algorithm for detecting a skin color region; and combining the skin color probability image with the second mask image and detecting the user's hand region.

17 Claims, 9 Drawing Sheets

(51) Int. Cl.
  G06T 7/40 (2006.01)
  G06K 9/00 (2006.01)
(52) U.S. Cl.
  CPC .......... G06K9/00375 (2013.01); G06K 9/4652 (2013.01); G06T 7/0081 (2013.01); G06T 7/0087 (2013.01); G06T 7/0093 (2013.01); G06T 7/0097 (2013.01); G06T 7/408 (2013.01); G06T 2207/10024 (2013.01); G06T 2207/10028 (2013.01); G06T 2207/20072 (2013.01); G06T 2207/20076 (2013.01); G06T 2207/30196 (2013.01)

(56) References Cited

U.S. PATENT DOCUMENTS

| | | | | |
|---|---|---|---|---|
| 8,116,517 | B2 * | 2/2012 | Kuwabara | G06K 9/00234 348/14.1 |
| 8,295,557 | B2 * | 10/2012 | Wang | G06T 7/0081 382/118 |
| 8,406,482 | B1 * | 3/2013 | Chien | G06K 9/4652 382/115 |
| 8,442,267 | B2 | 5/2013 | Shin et al. | |
| 8,787,663 | B2 * | 7/2014 | Litvak | G06K 9/00375 382/165 |
| 8,861,867 | B2 * | 10/2014 | Bvn | H04N 5/272 382/209 |
| 9,189,886 | B2 * | 11/2015 | Black | G06K 9/00369 |
| 2010/0235786 | A1 * | 9/2010 | Maizels | G06F 3/011 715/810 |
| 2010/0302138 | A1 * | 12/2010 | Poot | G06F 3/017 345/156 |
| 2010/0329511 | A1 | 12/2010 | Yoon et al. | |
| 2011/0052006 | A1 * | 3/2011 | Gurman | G06K 9/00201 382/103 |
| 2011/0164032 | A1 * | 7/2011 | Shadmi | G06F 3/017 345/419 |
| 2011/0237324 | A1 * | 9/2011 | Clavin | G06K 9/00369 463/29 |
| 2011/0292036 | A1 * | 12/2011 | Sali | G06T 13/40 345/419 |
| 2011/0293137 | A1 * | 12/2011 | Gurman | G06K 9/00201 382/103 |
| 2012/0070070 | A1 * | 3/2012 | Litvak | G06K 9/00201 382/154 |
| 2012/0119984 | A1 * | 5/2012 | Sankarasubramaniam | G06F 3/017 345/156 |

* cited by examiner

USER HAND DETECTING DEVICE FOR DETECTING USER'S HAND REGION AND METHOD THEREOF

CROSS-REFERENCE TO RELATED APPLICATION

This application claims priority to and the benefit of Korean Patent Application No. 10-2014-0057774, filed on May 14, 2014, the disclosure of which is incorporated herein by reference in its entirety.

BACKGROUND

1. Field of the Invention

The present invention relates to technology for detecting a user's hand region in an image, and more specifically, to a user hand detecting device for detecting a user's hand region in smart glasses.

2. Discussion of Related Art

Recently, various companies including Google Inc (Google Glass) have released various optical see-through smart glasses. Unlike video see-through head mounted displays (HMDs) in the related art, smart glasses can combine information observed by a user with an object of a real world and show the result.

As a method of interacting with content output to such smart glasses, methods in which a touch sensor, speech recognition, and gesture recognition using camera vision are used are proposed. For example, Google Glass (Google Inc) uses a touch pad of an eyeglass frame and speech recognition, and Space Glasses (Meta Company) uses a hand gesture recognition method using a time of flight (ToF) camera. Among them, a method of providing the most natural user interfaces/user experience (UI/UX) to a user is a method of performing an interaction using a hand with respect to content to be output.

Here, hand gesture recognition includes an accurate hand position detecting operation, a tracking and segmentation operation, and a recognition operation. In order to recognize a hand gesture accurately, the previous hand position detecting operation and tracking and segmentation operation are very important.

Meanwhile, a camera-based hand gesture recognition method includes a method in which color information obtained by a skin color model of a color camera is used, a method in which 3D depth information of an object obtained by a stereo camera, a ToF camera or the like is used, and a hybrid method in which two methods are combined.

Also, as a method in which skin color information is used in a color image, there are various methods such as a Gaussian mixture model. However, there is a problem in that a large amount of data is necessary to generate skin color information, and detection is difficult based on unlearned data.

Also, a method of segmenting a hand position using a 3D depth image has a problem in that it is difficult to segment a hand region precisely in depth information according to a change in an ambient environment (such as a texture).

SUMMARY OF THE INVENTION

The present invention provides a user hand detecting device capable of segmenting a hand region robustly to a change in an ambient environment in an image in which a user's hand is imaged, and a method thereof.

According to an aspect of the the present invention, there is provided a user hand detecting device for detecting a user's hand region, the device including an image acquiring unit configured to acquire a depth image and a color image obtained by imaging a user hand; a first mask image extracting unit configured to extract a first mask image from the depth image (the first mask image includes an object within a predetermined distance from an imaging device that has generated the depth image); a second mask image extracting unit configured to extract a second mask image having a preset skin color value among regions corresponding to the first mask image in the color image; a skin color probability image generating unit configured to generate first and second skin color value histogram models in first and second color spaces of a region of the color image corresponding to a color region of the second mask image, and generate a first skin color probability image of the first color space and a second skin color probability image of the second color space from the color image using the first and second skin color value histograms and an algorithm for detecting a skin color region (the first and second color spaces are different from the color space of the color image); and a hand region detecting unit configured to combine at least two of the first skin color probability image, the second skin color probability image and the second mask image and detect the user's hand region.

The color space of the color image may be an RGB color space, and the first and second color spaces may be a hue, intensity, saturation (HIS) color space and a YCbCr color space.

The second mask image extracting unit may extract a region corresponding to a preset Cb value and Cr value among regions corresponding to the first mask image in the color image as the second mask image.

The algorithm for detecting the skin color region may be a histogram back projection algorithm that uses a conditional probability and detects a region having a high probability of being a skin color.

The hand region detecting unit may perform an OR operation of at least one of the first and second skin color probability images and the second mask image.

The hand region detecting unit may perform an AND operation of the first skin color probability image and the second skin color probability image, and perform an OR operation of the output image of the AND operation result and the second mask image.

According to another aspect of the present invention, there is provided a method of detecting a user hand by a user hand detecting device, the method including: extracting a first mask image from a depth image in which the user hand is imaged (the first mask image includes an object within a predetermined distance from an imaging device that has generated the depth image); extracting a second mask image having a preset skin color value among regions corresponding to the first mask image in a color image in which the user hand is imaged; generating a skin color value histogram model in a color space different from a region of the color image corresponding to a color region of the second mask image; generating a skin color probability image of the different color space from the color image using the skin color value histogram model and an algorithm for detecting a skin color region; and combining the skin color probability image with the second mask image and detecting the user's hand region.

The different color space may be at least one of a hue, intensity, saturation (HIS) color space and a YCbCr color space.

The extracting of the second mask image may include extracting a region corresponding to a preset Cb value and Cr value among regions corresponding to the first mask image in the color image as the second mask image.

The algorithm may be a histogram back projection algorithm for detecting a region having a high probability of being a skin color using a conditional probability.

The detecting of the user's hand region may include detecting the user's hand region by performing an OR operation of the skin color probability image and the second mask image.

According to still another aspect of the present invention, there is provided a method of detecting a user hand by a user hand detecting device, the method including: extracting a first mask image from a depth image in which the user hand is imaged (the first mask image includes an object within a predetermined distance from an imaging device that has generated the depth image); extracting a second mask image having a preset skin color value among regions corresponding to the first mask image in a color image in which the user hand is imaged; generating first and second skin color value histogram models in first and second color spaces of a region of the color image corresponding to a color region of the second mask image (the first and second color spaces are different from a color space of the color image); generating a first skin color probability image of the first color space and a second skin color probability image of the second color space from the color image using the first and second skin color value histograms and an algorithm for detecting a skin color region; and combining at least two of the first skin color probability image, the second skin color probability image and the second mask image and detecting the user's hand region.

The extracting of the second mask image may include extracting a region corresponding to a preset Cb value and Cr value among regions corresponding to the first mask image in the color image as the second mask image.

The first and second color spaces may be a hue, intensity, saturation (HIS) color space and a YCbCr color space.

The algorithm for detecting the skin color region may be a histogram back projection algorithm for detecting a region having a high probability of being a skin color using a conditional probability.

The detecting of the user's hand region may include detecting the user's hand region by performing an OR operation of at least one of the first and second skin color probability images and the second mask image.

The detecting of the user's hand region may include detecting the user's hand region by performing an AND operation of the first skin color probability image and the second skin color probability image and performing an OR operation of the output image of the AND operation result and the second mask image.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
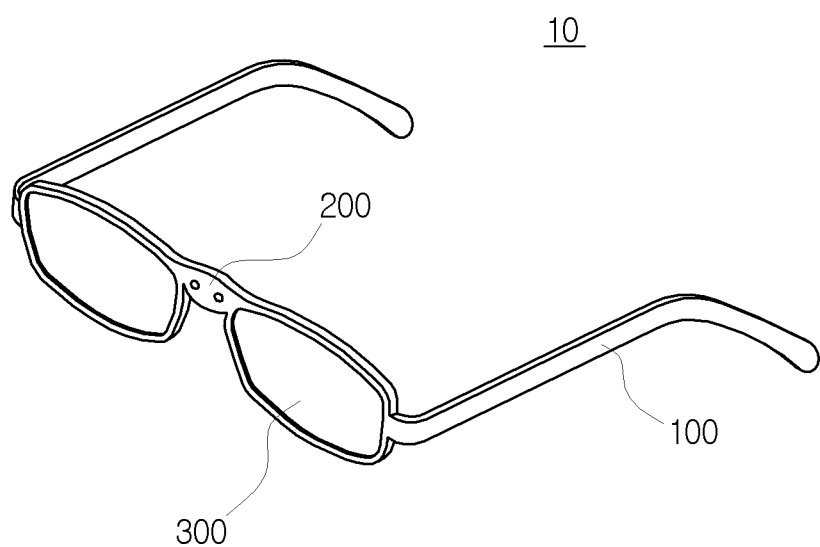
FIG. 1 is a diagram illustrating a see-through smart glasses in which a user hand detecting device according to an embodiment of the present invention is implemented.

Advantages and features of the present invention, and methods of achieving the same will be clearly understood with reference to the accompanying drawings and the following detailed embodiments. However, the present invention is not limited to the embodiments to be disclosed, but may be implemented in various different forms. The embodiments are provided in order to fully explain the present invention and fully explain the scope of the present invention for those skilled in the art. The scope of the present invention is defined by the appended claims. Meanwhile, the terms used herein are provided to only describe embodiments of the present invention and not for purposes of limitation. Unless the context clearly indicates otherwise, the singular forms include the plural forms. It will be understood that the terms "comprises" or "comprising" when used herein, specify some stated components, steps, operations and/or elements, but do not preclude the presence or addition of one or more other components, steps, operations and/or elements.

Hereinafter, exemplary embodiments of the present invention will be described in detail with reference to the accompanying drawings. First, when reference numerals are assigned to elements of each drawing, if the same elements are illustrated in different drawings, the same reference numerals are assigned to the same elements whenever possible. Also, in descriptions of the present invention, when detailed descriptions of related known configurations or functions are deemed to unnecessarily obscure the gist of the present invention, they will be omitted.

FIG. 1 is a diagram illustrating a see-through smart glasses 10 in which a user hand detecting device according to an embodiment of the present invention is implemented.

As illustrated in FIG. 1, the see-through smart glasses 10 images a user hand through a camera 200 that is implemented in a predetermined position of an eyeglasses bridge. In this case, the user hand is imaged by a depth camera and a color camera.

The depth camera is a camera that is operated by a stereo method or a camera that is operated by a time of flight (TOF) method. A depth image in which the user hand is imaged by the depth camera includes distance information from the depth camera for each pixel.

The color camera is a camera using an image sensor such as a charge coupled device (CCD) or a complementary metal oxide semiconductor (CMOS). A color image in which the user hand is imaged by the color camera includes color information for each pixel. In this case, the color image may be an image including color information expressed in a red, green, and blue (RGB) color space. Also, the color image may be an image including color information expressed in a YCbCr color space or a hue, intensity, and saturation (HIS) color space. In the present invention, the RGB color space color image will be exemplified.

Images (the depth image and the color image) in which the user hand is imaged are transmitted to a user hand detecting device 100 implemented in a predetermined position of an eyeglasses temple. In this case, the images are transmitted to the user hand detecting device 100 through wired or wireless communication.

The user hand detecting device 100 performs image processing on the images transmitted from the camera 200 and detects the user hand in the image. In this case, technology for detecting the user hand accurately in the image is necessary under various environments (such as light and a complex background).

Accordingly, the user hand detecting device 100 provides technology for detecting the user hand using the depth image and the color image, and details thereof will be described below.

Figure 2A:
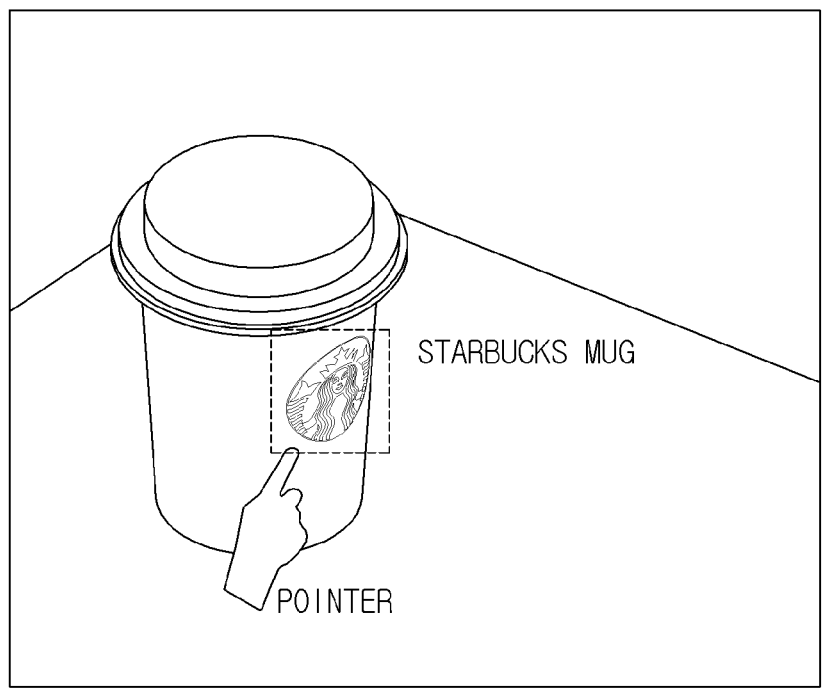
FIG. 2A and FIG. 2B are a diagram illustrating an exemplary image in which a user hand detected by an embodiment of the present invention interacts with content and the result is provided to a user.
Figure 2B:
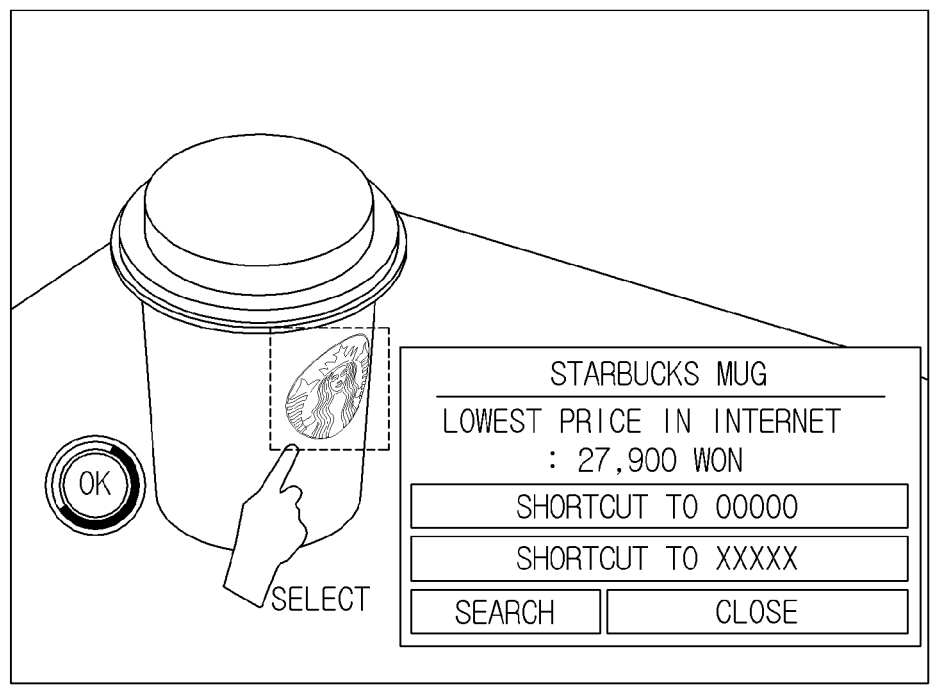

The smart glasses 10 may track the user hand's position detected by the user hand detecting device 100, output the result through a lens 25, and provide the result to the user. For example, as exemplified in FIG. 2A and FIG. 2B, the user hand detected by the smart glasses 10 may interact with content and the result may be provided to the user.

Figure 3:
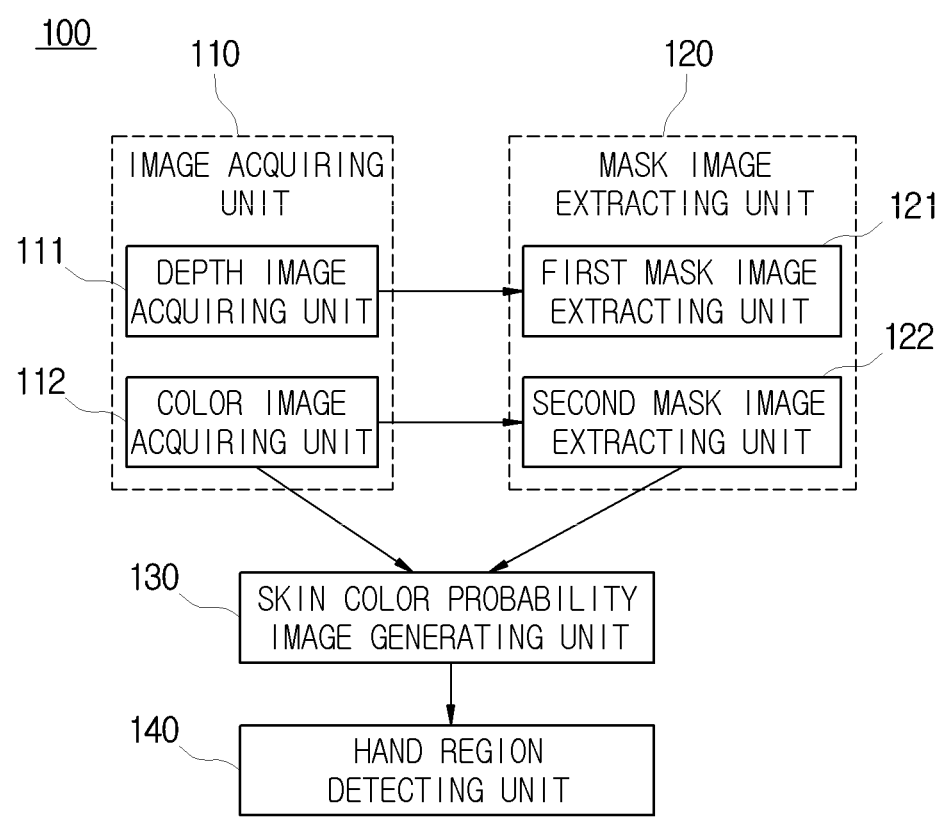
FIG. 3 is a block diagram illustrating a user hand detecting device for detecting a user's hand region according to an embodiment of the present invention.

FIG. 3 is a block diagram illustrating a user hand detecting device for detecting a user's hand region according to an embodiment of the present invention.

The user hand detecting device 100 according to the embodiment of the present invention extracts first and second mask images from the depth image and the color image, generates a skin color probability image expressed in a color space different from the color image using the extracted second mask image, combines the generated skin color probability image with the second mask image, and detects the hand region.

For this purpose, as illustrated in FIG. 1, the user hand detecting device 100 according to the embodiment of the present invention includes an image acquiring unit 110, a mask image extracting unit 120, a skin color probability image generating unit 130 and a hand region detecting unit 140. Hereinafter, the user hand detecting device 100 will be described in detail with reference to FIGS. 4 and 5.

Figure 4:
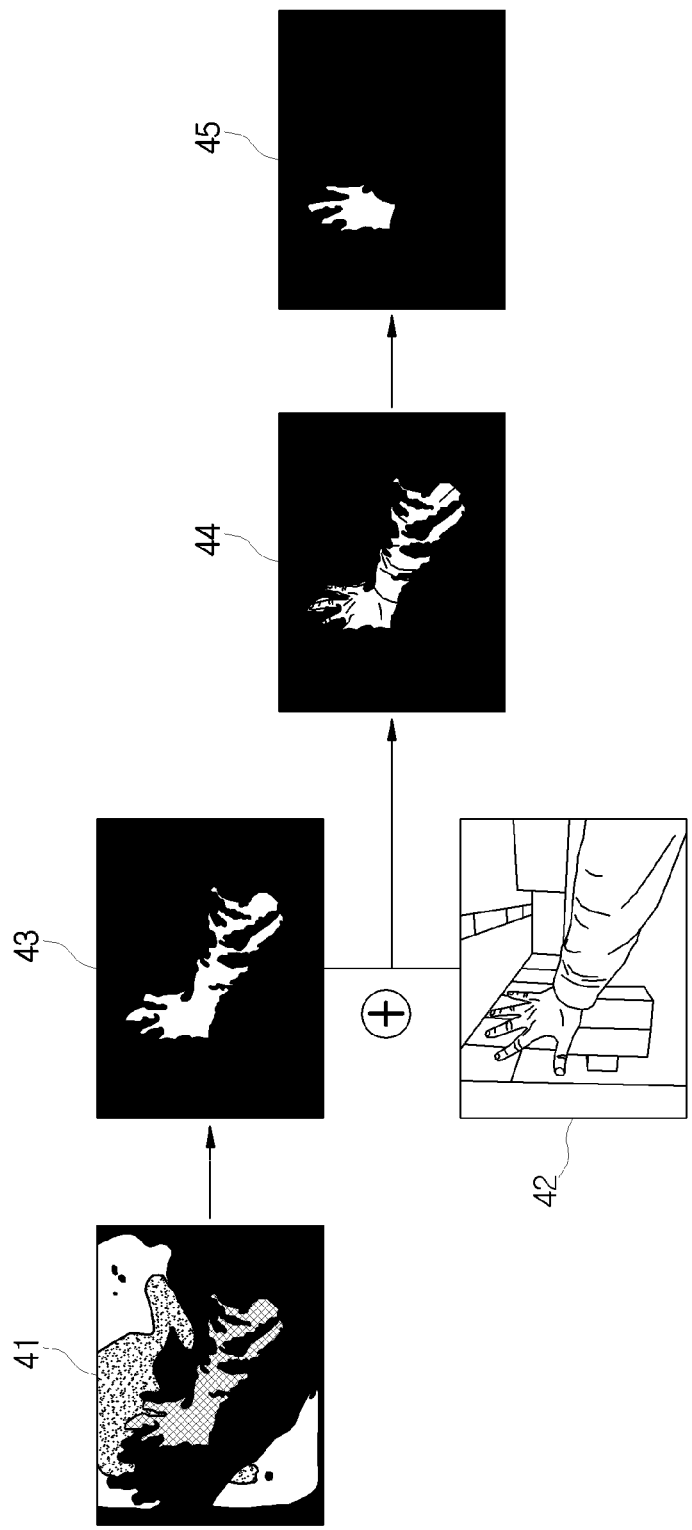
FIG. 4 is a first exemplary diagram illustrating exemplary images for describing a method of detecting a user's hand region according to the present invention.
Figure 5:
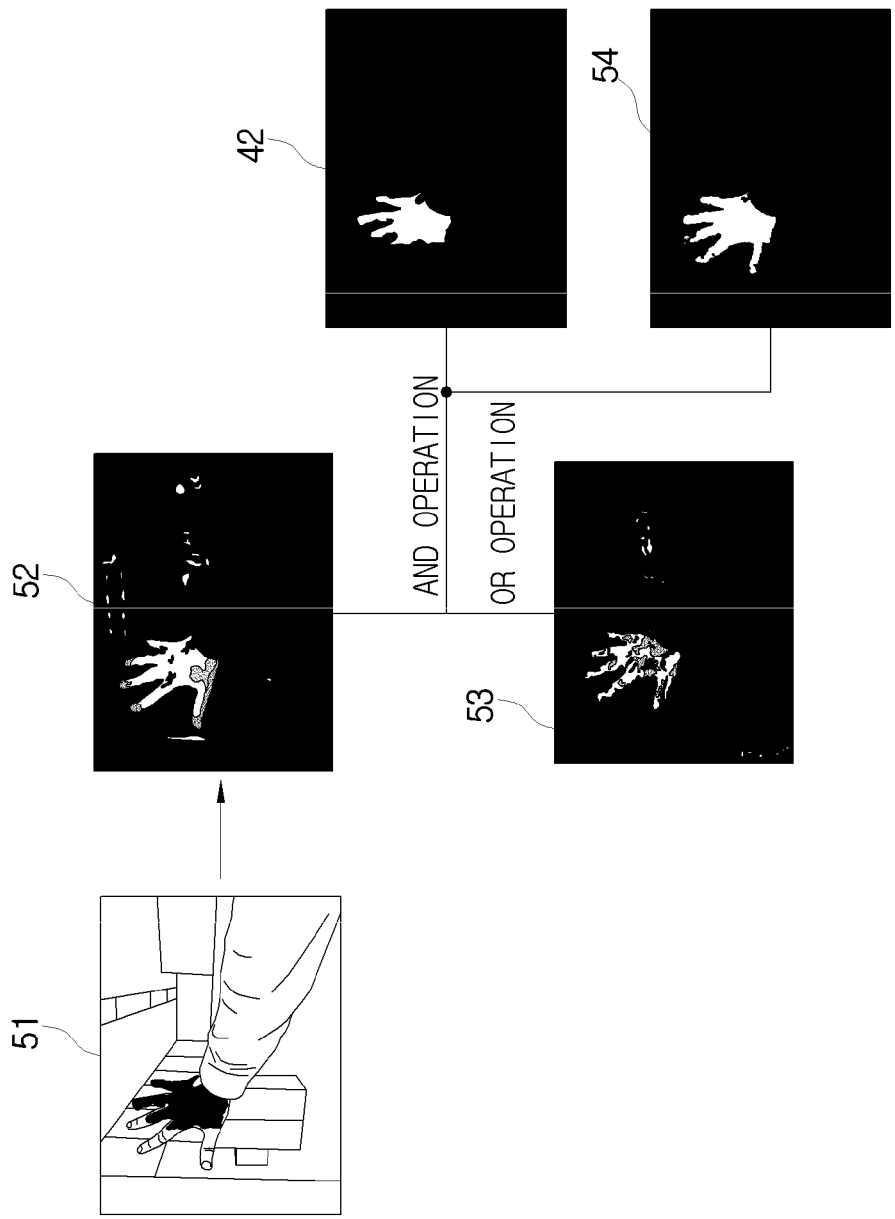
FIG. 5 is a second exemplary diagram illustrating exemplary images for describing a method of detecting a user's hand region according to the present invention.

FIG. 4 is a first exemplary diagram illustrating exemplary images for describing a method of detecting a user's hand region according to the present invention. FIG. 5 is a second exemplary diagram illustrating exemplary images for describing a method of detecting a user's hand region according to the present invention.

The image acquiring unit 110 acquires the image in which the user hand is imaged from the camera 200 of the smart glasses 10. Here, the image acquiring unit 110 includes a depth image acquiring unit 111 and a color image acquiring unit 112. The depth image acquiring unit 111 acquires a depth image 41 in which the user hand is imaged from the depth camera through wired or wireless communication. Also, the color image acquiring unit 112 acquires a color image 42 in which the user hand is imaged from the color camera through wired or wireless communication.

The mask image extracting unit 120 uses the depth image 41 and the color image 42 acquired through the image acquiring unit 110 and extracts a mask image representing the user's hand region approximately. Here, the mask image extracting unit 120 includes a first mask image extracting unit 121 and a second mask image extracting unit 122.

The first mask image extracting unit 121 extracts a first mask image 43 (coarse mask) from the depth image 41 acquired through the depth image acquiring unit 111. In this case, the first mask image extracting unit 121 extracts the first mask image 43 including an object within a predetermined distance (for example, 35 cm) from the depth camera in the depth image 41.

This is because the hand position when the user wearing the smart glasses 10 outstretches his or her hand is highly likely to be positioned within the predetermined distance. Here, the predetermined distance can be changed by physical characteristics of the user.

The second mask image extracting unit 122 uses the color image 42 acquired through the color image acquiring unit 112 and the first mask image 43 extracted by the first mask image extracting unit 121 and extracts a second mask image 45 (fine mask). Here, the second mask image extracting unit 122 extracts a region having a preset skin color value among regions corresponding to the first mask image 43 in the color image 42 as the second mask image 45.

For example, the second mask image extracting unit 122 may extract a region having a preset skin color value among color regions of an image 44 in which the color image 42 is mapped with the first mask image 43 as the second mask image 45. Here, the preset skin color value may be a predetermined range value of a Cb value and a Cr value.

For this purpose, the second mask image extracting unit 122 may convert a color space of an image using an image processing algorithm. Here, the image processing algorithm is an algorithm for converting a color space of the color image 42 into a different color space. For example, the image processing algorithm may be an algorithm for converting the color image 42 from an RGB color space into a YCbCr color space.

As an example, the second mask image extracting unit 122 may convert first the color space of the color image 42 acquired through the color image acquiring unit 112. That is, the second mask image extracting unit 122 converts the color image 42 expressed in the RGB color space into an image expressed in the YCbCr color space and then maps the result with the first mask image 43.

As another example, the second mask image extracting unit 122 may map the color image 42 with the first mask image 43 first, and then convert a color space of the mapped image 44. In this case, the mask image extracting unit 120 converts the mapped image 44 expressed in the RGB color space into an image expressed in the YCbCr color space.

When the color image acquired through the color image acquiring unit 112 is an image expressed in the YCbCr color space rather than the RGB color space, the second mask image extracting unit 122 may omit a process of converting the color space.

The second mask image extracting unit 122 determines a Cb value and a Cr value among a Y value, a Cb value, and a Cr value of the mapped image 44, and extracts the second mask image 45. In this case, the second mask image extracting unit 122 may extract a region in which a Cb value and a Cr value are within a predetermined range in the mapped image 44 as the second mask image 45.

For example, the second mask image extracting unit 122 may extract regions satisfying at least one among three ranges of $85<Cb<127$, $137<Cr<177$, and $183<Cb+0.6*Cr<219$ in the mapped image 44 as the second mask image 45. Preferably, the second mask image extracting unit 122 may extract regions satisfying all of the above three ranges in the mapped image 44 as the second mask image 45. Such predetermined ranges may be changed and set by a worker in advance according to a skin color difference for each ethnic group or the like.

The skin color probability image generating unit 130 generates a skin color probability image in order to extract a hand region that is not included in the second mask image 45, that is, in order to increase accuracy of user hand detection.

The skin color probability image generating unit 130 generates first and second skin color value histogram models in first and second color spaces with respect to a color region of the second mask image 45.

That is, the skin color probability image generating unit 130 generates the first and second skin color value histogram models in the first and second color spaces with respect to a color region in which the color image 42 is mapped with the second mask image 45. Here, the first and second color spaces are color spaces different from the color space of the color image 42. For example, when the color image 42 is assumed to have a color signal according to the RGB color space, the first color space may be the HIS color space, and the second color space may be the YCbCr color space.

The skin color probability image generating unit 130 uses the first and second skin color value histogram models and an algorithm for detecting a skin color region, and generates first and second skin color probability images 52 and 53. Here, the first and second skin color probability images 52 and 53 refer to an extracted region (for example, a region having a probability of being a skin color that is a predetermined probability value or more) having a high probability of being a skin color in the color image 42.

For example, the algorithm is a histogram back projection algorithm that uses a conditional probability and detects a region having a high probability of being a skin color in an image. The histogram back projection algorithm is a method in which a color histogram is used to extract color features and a conditional probability value of an input pixel is extracted. Specifically, the histogram back projection algorithm uses Equation 1, and estimates a posteriori probability value of an input pixel in a predefined histogram.

$$p(O \mid C) = \frac{P(O)}{P(C)} P(C \mid O) \quad \text{[Equation 1]}$$

Here, O denotes an event in which a skin color of the user hand is expressed, and C denotes an event in which there is a corresponding pixel. A conditional probability P(C|O) denotes a probability of a pixel being a color C when the pixel is extracted from a skin color of the user's hand. On the other hand, a conditional probability P(O|C) denotes a probability of the pixel being extracted from the user hand.

Specifically, the skin color probability image generating unit 130 generates a color value histogram of the color image 42 in the first color space. Also, the skin color probability image generating unit 130 uses the generated color value histogram, a first skin color value histogram model and a histogram back projection algorithm, detects a region having a high probability of being a skin color in the color image 42, and generates a first skin color probability image 52.

Similarly, the skin color probability image generating unit 130 generates a color value histogram of the color image 42 in the second color space. Also, the skin color probability image generating unit 130 uses the generated color value histogram, a second skin color value histogram model and a histogram back projection algorithm, detects a region having a high probability of being a skin color in the color image 42, and generates a second skin color probability image 53.

The hand region detecting unit 140 combines the first and second skin color probability images 52 and 53 generated in the skin color probability image generating unit 130 with the second mask image 45, and detects the user's hand region.

As an example, the hand region detecting unit 140 combines the first skin color probability image 52 with the second skin color probability image 53 first. In this case, the hand region detecting unit 140 acquires an image in which an AND operation of the first skin color probability image 52 and the second skin color probability image 53 is performed. Here, the image on which the AND operation is performed is an image in which only a region common between the first skin color probability image 52 and the second skin color probability image 53 is extracted and noise is removed.

Also, the hand region detecting unit 140 combines the image in which noise is removed according to the AND operation result with the second mask image 45, and acquires a hand region detection image 54. In this case, the hand region detecting unit 140 performs an OR operation of the image in which noise is removed and the second mask image 45, and acquires the hand region detection image 54. Here, the hand region detection image 54 on which the OR operation is performed is an image in which all regions included in the image in which noise is removed or included in the second mask image 45 are extracted and detected as a hand region.

As another example, the hand region detecting unit 140 may combine (OR operation) at least one of the first skin color probability image 52 and the second skin color probability image 53 with the second mask image 45 and detect a hand region.

In this manner, the user hand detecting device according to the embodiment of the present invention uses the depth image and the color image, extracts first and second mask images, generates a skin color probability image expressed in a color space different from the color image, combines the generated skin color probability image with a mask image, and detects the user's hand region. Therefore, it is possible to increase accuracy of technology for detecting the user hand in images under various environments such as light and a complex background.

Figure 6:
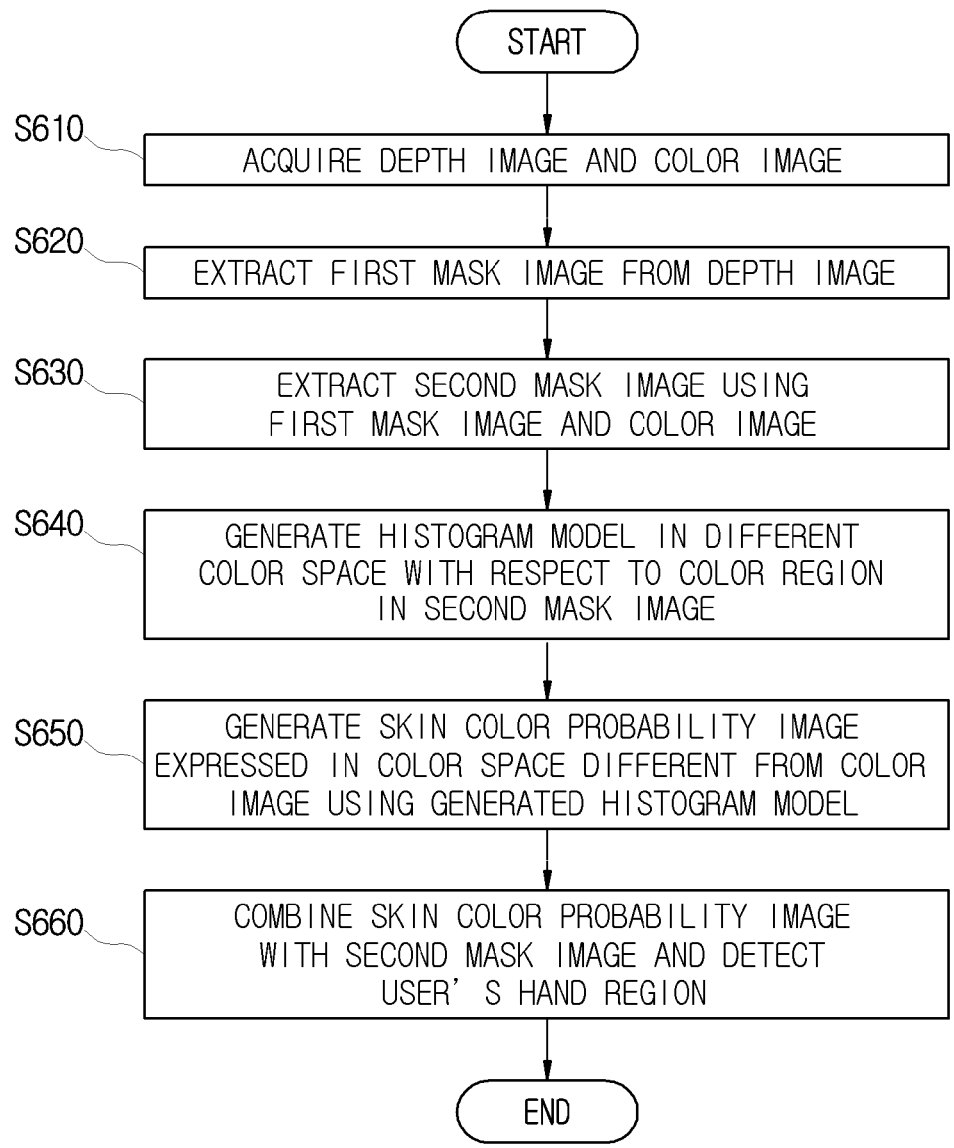
FIG. 6 is a flowchart illustrating a method of detecting a user's hand region by a user hand detecting device according to an embodiment of the present invention.

FIG. 6 is a flowchart illustrating a method of detecting a user hand by a user hand detecting device according to an embodiment of the present invention. Here, unless otherwise specifically described, the following operations are performed by the user hand detecting device 100.

In operation S610, a process of acquiring the depth image 41 and the color image 42 is performed. Here, the depth image and the color image are acquired from the camera 200 of the smart glasses 10 (the depth camera and the color camera). In this case, the depth image 41 and the color image 42 may be acquired from the camera 200 through wired or wireless communication.

In operation S620, a process of extracting the first mask image 43 from the depth image 41 is performed. Here, the first mask image 43 includes an object within a predetermined distance (for example, 35 cm) from the depth camera in the depth image 41. This is because the hand position when the user wearing the smart glasses 10 outstretches his or her hand is highly likely to be positioned within the predetermined distance. Here, the predetermined distance can be changed by physical characteristics of the user.

In operation S630, a process of extracting the second mask image 45 using the first mask image 43 and the color image 42 is performed. Here, the second mask image 45 shows a region having a preset skin color value among regions corresponding to the first mask image 43 in the color image 42. For example, a region having a preset skin color value among color regions of the image 44 in which the color image 42 is mapped with the first mask image 43 may be extracted as the second mask image 45. Here, the preset skin color value may be a predetermined range value of a Cb value and a Cr value.

For this purpose, an image processing algorithm may be used to convert a color space of the color image 42. Here, the image processing algorithm is an algorithm for converting a color space when the color image 42 is obtained from the camera 200 into a different color space. For example, when the color image 42 is an image of the RGB color space, the image processing algorithm converts the color image 42 from the RGB color space into the YCbCr color space.

The color image 42 in the RGB color space is converted into the image in the YCbCr color space, and then a region having a preset skin color value among regions corresponding to the first mask image 43 is extracted as the second mask image 45. In this case, a region in which a Cb value and a Cr value of the mapped region among a Y value, a Cb value, and a Cr value are within a predetermined range may be extracted as the second mask image 45. Here, the predetermined range may be changed and set by a worker in advance according to a skin color difference for each ethnic group or the like. For example, a region satisfying ranges of 85<Cb<127, 137<Cr<177, and 183<Cb+0.6*Cr<219 in the mapped region may be extracted as the second mask image 45.

In operation S640, a process of generating a skin color value histogram model in a different color space with respect to a color region 51 in the second mask image 45 is performed. In this case, a skin color value histogram model in a color space different from the color space of the color image 42 acquired from the camera 200 is generated. For example, when the color image 42 is assumed to have a color signal according to the RGB color space, the different color space may be the HIS color space or the YCbCr color space.

In operation S650, a process of generating a skin color probability image expressed in the color space different from the color image 42 using the skin color value histogram model is performed. Here, through an algorithm for detecting a skin color region, a region (for example, a region having a probability of being a skin color that is a predetermined value or more) having a high probability of being a skin color in the color image 42 is extracted and a skin color probability image is generated. In this case, the algorithm is a histogram back projection algorithm for detecting a region having a high probability of being a skin color in the image using Equation 1.

Also, a color value histogram of the color image 42 in a different color space (for example, the HIS or YCbCr color space) is generated. Then, the generated color value histogram, the skin color value histogram model generated in operation S640, and the histogram back projection algorithm are used, and a region having a high probability of being a skin color in the color image 42 is generated as a skin color probability image.

In operation S660, a process of combining the skin color probability image with the second mask image 45 and detecting the hand region is performed. For example, an OR operation of the skin color probability image and the second mask image 45 is performed and the hand region detection image 54 is acquired. Here, through OR operation, all regions included in the skin color probability image and the second mask image 45 are extracted.

In this manner, the user hand detecting device according to the embodiment of the present invention uses the depth image and the color image, extracts first and second mask images, generates a skin color probability image expressed in a color space different from the color image, combines the generated skin color probability image with a mask image, and detects the user's hand region. Therefore, it is possible to increase accuracy of technology for detecting the user hand in images under various environments such as light and a complex background.

Figure 7:
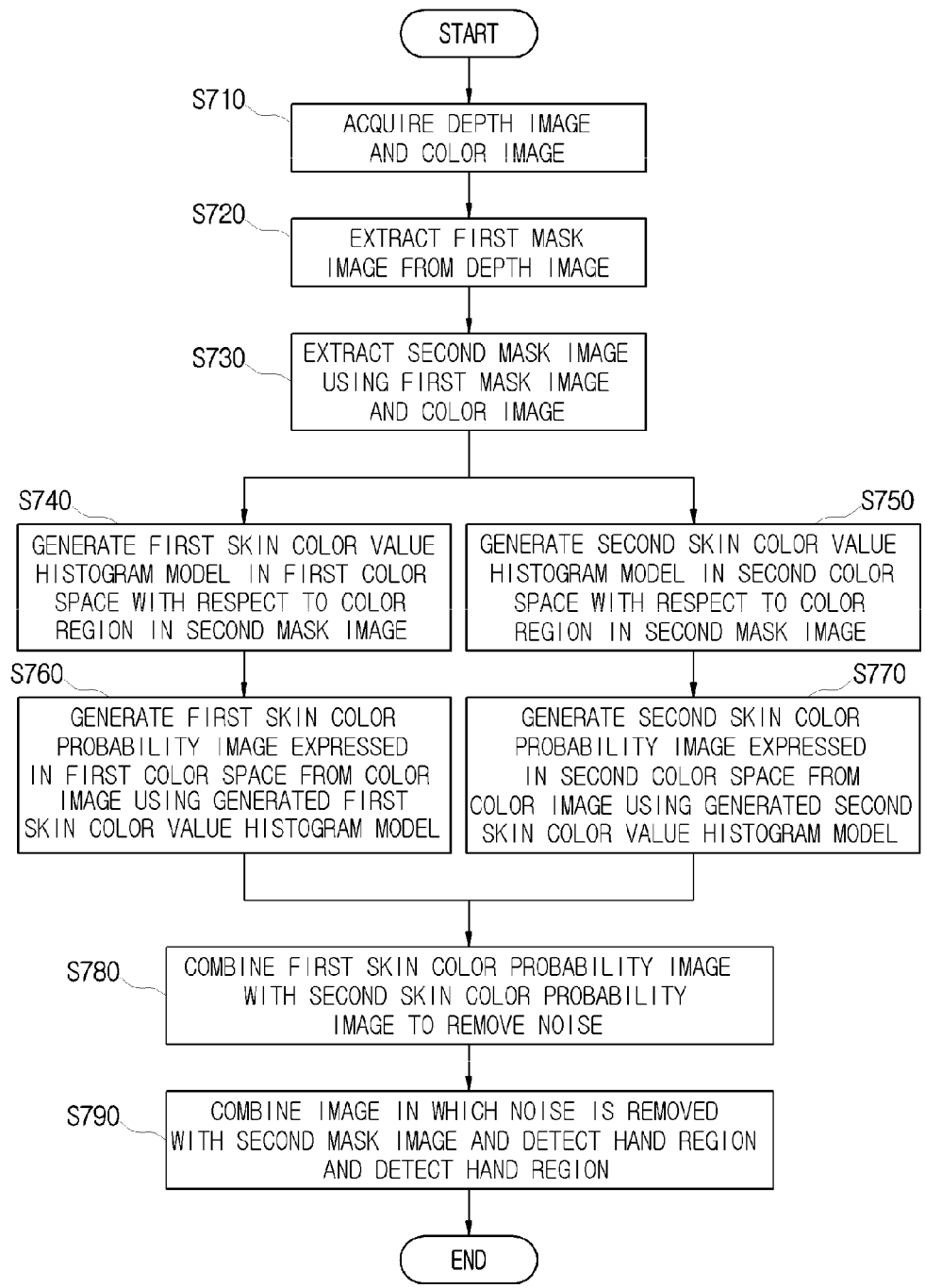
FIG. 7 is a flowchart illustrating a method of detecting a user's hand region by a user hand detecting device according to another embodiment of the present invention.

FIG. 7 is a flowchart illustrating a method of detecting a user hand by a user hand detecting device according to another embodiment of the present invention. Here, unless otherwise specifically described, the following operations are performed by the user hand detecting device 100.

In operation S710, a process of acquiring the depth image 41 and the color image 42 is performed. Here, the depth image 41 and the color image 42 are acquired from the camera 200 of the smart glasses 10 (the depth camera and the color camera) through wired or wireless communication.

In operation S720, a process of extracting the first mask image 43 from the depth image 41 is performed. Here, the first mask image 43 includes an object within a predetermined distance (for example, 35 cm) from the depth camera in the depth image 41. This is because the hand position when the user wearing the smart glasses 10 outstretches his or her hand is highly likely to be positioned within the predetermined distance. Here, the predetermined distance can be changed by physical characteristics of the user.

In operation S730, a process of extracting the second mask image 45 using the first mask image 43 and the color image 42 is performed. Here, the second mask image 45 shows a region having a preset skin color value among regions corresponding to the first mask image 43 in the color image 42. For example, a region having a preset skin color value among color regions of the image 44 in which the color image 42 is mapped with the first mask image 43 may be extracted as the second mask image 45. Here, the preset skin color value may be a predetermined range value of a Cb value and a Cr value.

For this purpose, an image processing algorithm may be used to convert a color space of the color image 42. Here, the image processing algorithm is an algorithm for converting a color space when the color image 42 is obtained from the camera 200 into a different color space. For example, when the color image 42 is an image of the RGB color space, the image processing algorithm converts the color image 42 from the RGB color space into the YCbCr color space.

The color image 42 in the RGB color space is converted into the image in the YCbCr color space, and then a region having a preset skin color value among regions corresponding to the first mask image 43 is extracted as the second mask image 45. In this case, a region in which a Cb value and a Cr value of the mapped region among a Y value, a Cb value, and a Cr value are within a predetermined range may be extracted as the second mask image 45. Here, the predetermined range may be changed and set by a worker in advance according to a skin color difference for each ethnic group or the like. For example, a region satisfying ranges of 85<Cb<127, 137<Cr<177, and 183<Cb+0.6*Cr<219 in the mapped region may be extracted as the second mask image 45.

In operation S740, a process of generating a first skin color value histogram model in the first color space with respect to a color region in the second mask image 45 is performed. In this case, a first skin color value histogram model in the first color space different from the color space of the color image 42 acquired from the camera 200 is generated. For example, the first color space may be the HIS color space.

Similarly, in operation S750, a process of generating a second skin color value histogram model in the second color space with respect to a color region in the second mask image 45 is performed. In this case, a second skin color value histogram model in the second color space different from the color space of the color image 42 acquired from the camera 200 and the first color space is generated. For example, the second color space may be the YCbCr color space.

In operation S760, a process of generating the first skin color probability image 52 expressed in the first color space from the color image 42 using the first skin color value histogram model generated in operation S740 is performed. Here, through an algorithm for detecting a skin color region, a region (for example, a region having a probability of being a skin color that is a predetermined value or more) having a high probability of being a skin color in the color image 42 is extracted and the first skin color probability image 52 is generated. In this case, the algorithm is a histogram back projection algorithm for detecting a region having a high probability of being a skin color in the image. For example, the first skin color probability image 52 is obtained such that a color value histogram of the color image 42 in the first color space is generated, the generated color value histogram, the first skin color value histogram model and the histogram back projection algorithm are used, and a region having a high probability of being a skin color in the color image 42 is extracted.

Similarly, in operation S770, a process of generating the second skin color probability image 53 expressed in the second color space from the color image 42 using the second skin color value histogram model generated in operation S750 is performed. Here, similar to operation S760, the histogram back projection algorithm is used. For example, the second skin color probability image 53 is obtained such that a color value histogram of the color image 42 in the second color space is generated, the generated color value histogram, the second skin color value histogram model and the histogram back projection algorithm are used, and a region having a high probability of being a skin color in the color image 42 is extracted.

In operation S780, a process of combining the first skin color probability image 52 generated in operation S760 with the second skin color probability image 53 generated in operation S770 and removing noise is performed. In this case, through an AND operation, only a region common between the first skin color probability image 52 and the second skin color probability image 53 may be extracted and acquired as the image in which noise is removed.

In operation S790, the image in which noise is removed in operation S780 and the second mask image 45 are combined and the hand region is detected. In this case, an OR operation of the image in which noise is removed and the second mask image 45 is performed and the hand region detection image 54 may be acquired. Here, through the OR operation, all regions included in the image in which noise is removed or included in the second mask image 45 are extracted.

In this manner, the user hand detecting device according to another embodiment of the present invention uses the depth image and the color image, extracts first and second mask images, generates first and second skin color probability images expressed in a color space different from the color image, combines the generated first and second skin color probability images with a mask image, and detects the user's hand region. Therefore, it is possible to increase accuracy of technology for detecting the user hand in images under various environments such as light and a complex background.

The user hand detecting device according to the embodiment of the present invention uses a depth image and a color image to extract a mask image, generates a skin color probability image expressed in a color space different from the color image, combines the generated skin color probability image with the mask image, and detects the user's hand region. Accordingly, it is possible to increase accuracy of technology for detecting the user hand in images under various environments such as light and a complex background.

Figure 8:
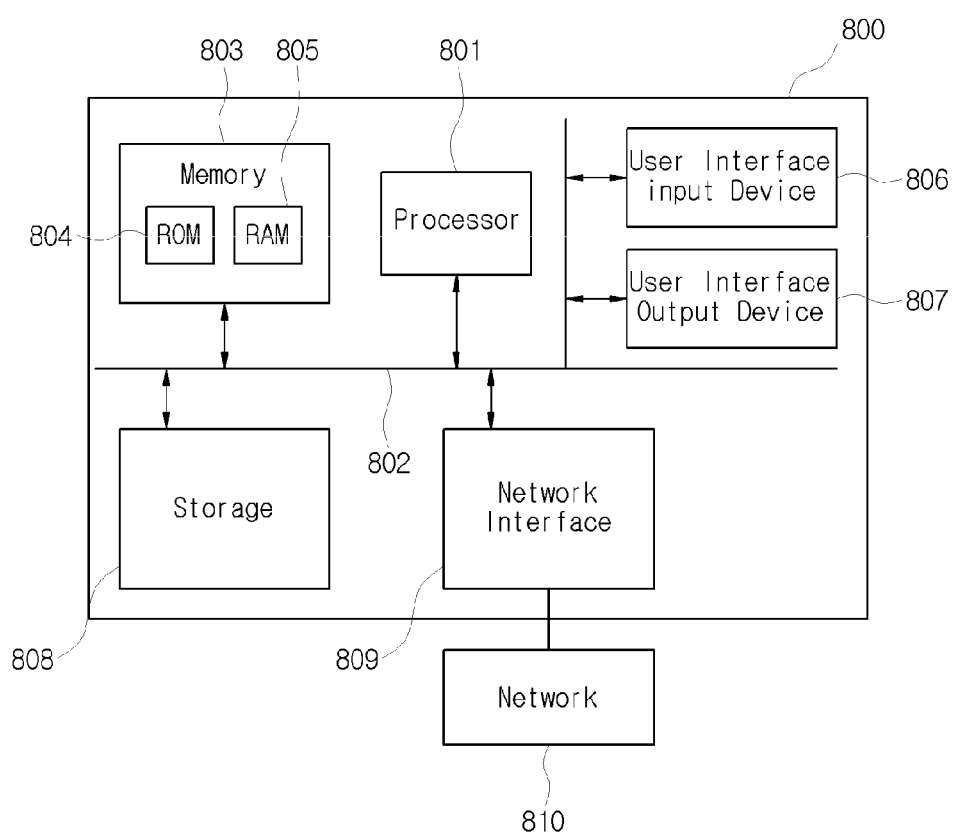
FIG. 8 is a block diagram illustrating a computer system for the present invention.

An embodiment of the present invention may be implemented in a computer system, e.g., as a computer readable medium. As shown in FIG. 8, a computer system 800 may include one or more of a processor 801, a memory 803, a user input device 806, a user output device 807, and a storage 808, each of which communicates through a bus 802. The computer system 800 may also include a network interface 809 that is coupled to a network 810. The processor 801 may be a central processing unit (CPU) or a semiconductor device that executes processing instructions stored in the memory 803 and/or the storage 808. The memory 803 and the storage 808 may include various forms of volatile or non-volatile storage media. For example, the memory may include a read-only memory (ROM) 804 and a random access memory (RAM) 805.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

The configuration of the present invention has been described above in detail through exemplary embodiments of the present invention, but it will be understood by those skilled in the art that the present invention may be performed in other concrete forms without changing the technological scope and essential features. Therefore, the above-described embodiments should be considered in a descriptive sense only and not for purposes of limitation. The scope of the present invention is defined not by the detailed description but by the appended claims, and encompasses all modifications and alterations derived from the scope and equivalents of the appended claims.

REFERENCE NUMERALS

| 10: see-through smart glasses | 100: user hand detecting device |
|---|---|
| 110: image acquiring unit | 120: mask image extracting unit |
| 130: skin color probability image generating unit | 140: hand region detecting unit |
| 200: camera | 300: lens |

What is claimed is:

1. A user hand detecting device for detecting a user's hand region, comprising:
    an image acquiring unit configured to acquire a depth image and a color image obtained by imaging a user hand;
    a first mask image extracting unit configured to extract a first mask image from the depth image—the first mask image includes an object within a predetermined distance from an imaging device that has generated the depth image;
    a second mask image extracting unit configured to extract a second mask image having a preset skin color value among regions corresponding to the first mask image in the color image;
    a skin color probability image generating unit configured to generate first and second skin color value histogram models in first and second color spaces of a region of the color image corresponding to a color region of the second mask image, and generate a first skin color probability image of the first color space and a second skin color probability image of the second color space from the color image using the first and second skin color value histograms and an algorithm for detecting a skin color region—the first and second color spaces are different from the color space of the color image; and a hand region detecting unit configured to combine at least two of the first skin color probability image, the second skin color probability image and the second mask image and detect the user's hand region.

2. The device according to claim 1,
wherein the color space of the color image is an RGB color space, and
the first and second color spaces are a hue, intensity, saturation (HIS) color space and a YCbCr color space.

3. The device according to claim 1,
wherein the second mask image extracting unit extracts a region corresponding to a preset Cb value and Cr value among regions corresponding to the first mask image in the color image as the second mask image.

4. The device according to claim 1,
wherein the algorithm for detecting the skin color region is a histogram back projection algorithm that uses a conditional probability and detects a region having a high probability of being a skin color.

5. The device according to claim 1,
wherein the hand region detecting unit performs an OR operation of at least one of the first and second skin color probability images and the second mask image.

6. The device according to claim 1,
wherein the hand region detecting unit performs an AND operation of the first skin color probability image and the second skin color probability image, and performs an OR operation of the output image of the AND operation result and the second mask image.

7. A method of detecting a user hand by a user hand detecting device, the method comprising:
extracting a first mask image from a depth image in which the user hand is imaged—the first mask image includes an object within a predetermined distance from an imaging device that has generated the depth image;
extracting a second mask image having a preset skin color value among regions corresponding to the first mask image in a color image in which the user hand is imaged;
generating a skin color value histogram model in a color space different from a region of the color image corresponding to a color region of the second mask image;
generating a skin color probability image of the different color space from the color image using the skin color value histogram model and an algorithm for detecting a skin color region; and
combining the skin color probability image with the second mask image and detecting the user's hand region.

8. The method according to claim 7,
wherein the different color space is at least one of a hue, intensity, saturation (HIS) color space and a YCbCr color space.

9. The method according to claim 7,
wherein the extracting of the second mask image includes extracting a region corresponding to a preset Cb value and Cr value among regions corresponding to the first mask image in the color image as the second mask image.

10. The method according to claim 7,
wherein the algorithm is a histogram back projection algorithm for detecting a region having a high probability of being a skin color using a conditional probability.

11. The method according to claim 7,
wherein the detecting of the user's hand region includes detecting the user's hand region by performing an OR operation of the skin color probability image and the second mask image.

12. A method of detecting a user hand by a user hand detecting device, the method comprising:
extracting a first mask image from a depth image in which the user hand is imaged—the first mask image includes an object within a predetermined distance from an imaging device that has generated the depth image;
extracting a second mask image having a preset skin color value among regions corresponding to the first mask image in a color image in which the user hand is imaged;
generating first and second skin color value histogram models in first and second color spaces of a region of the color image corresponding to a color region of the second mask image—the first and second color spaces are different from a color space of the color image;
generating a first skin color probability image of the first color space and a second skin color probability image of the second color space from the color image using the first and second skin color value histograms and an algorithm for detecting a skin color region; and
combining at least two of the first skin color probability image, the second skin color probability image and the second mask image and detecting the user's hand region.

13. The method according to claim 12,
wherein the extracting of the second mask image includes extracting a region corresponding to a preset Cb value and Cr value among regions corresponding to the first mask image in the color image as the second mask image.

14. The method according to claim 12,
wherein the first and second color spaces are a hue, intensity, saturation (HIS) color space and a YCbCr color space.

15. The method according to claim 12,
wherein the algorithm for detecting the skin color region is a histogram back projection algorithm for detecting a region having a high probability of being a skin color using a conditional probability.

16. The method according to claim 12,
wherein the detecting of the user's hand region includes detecting the user's hand region by performing an OR operation of at least one of the first and second skin color probability images and the second mask image.

17. The method according to claim 12,
wherein the detecting of the user's hand region includes detecting the user's hand region by performing an AND operation of the first skin color probability image and the second skin color probability image and performing an OR operation of the output image of the AND operation result and the second mask image.

* * * * *